May 22, 1928.
H. H. RIGGIN
FAUCET OR BIBCOCK
Filed Jan. 16, 1926
1,670,691
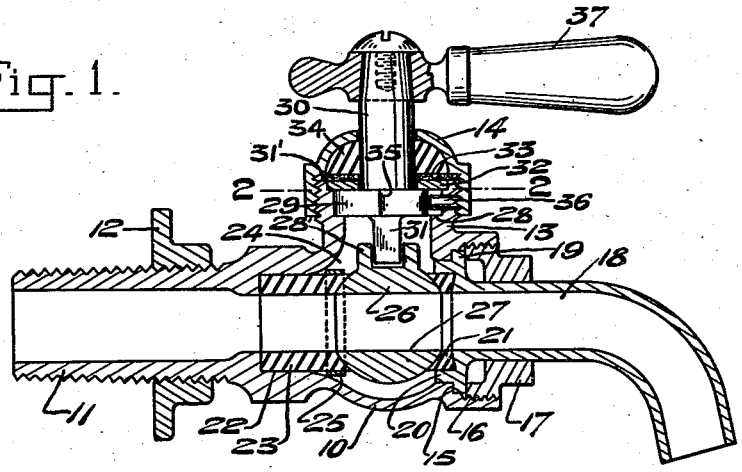
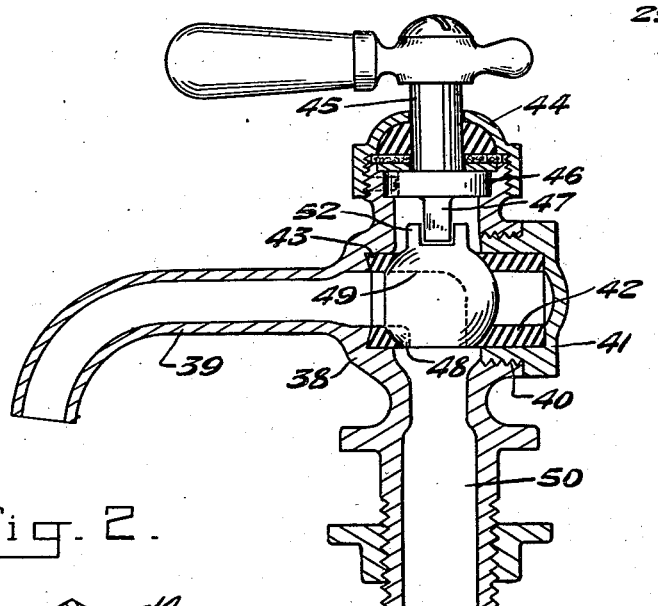
Inventor
Henry H. Riggin
By Watson E. Coleman
Attorney Patented May 22, 1928.

1,670,691

UNITED STATES PATENT OFFICE.

HENRY H. RIGGIN, OF ALTOONA, PENNSYLVANIA.

FAUCET OR BIBCOCK.

Application filed January 16, 1926. Serial No. 81,746.

This invention relates to valves of the character of faucets or bib cocks and it particularly relates to the construction of the valve proper and the seats therefor.

One of the principal difficulties with valves of this character is that the valve and coacting seats wear under usage and leak and when this occurs it is necessary to re-grind the valve seat, a more or less expensive operation.

A further objection lies in the fact that when the valve is closed the pressure against the valve tends to cause the stem of the valve to bind and another object is that valves and faucets of this character are very likely to leak around the stem.

One of the objects of the present invention is to provide a valve of this character so constructed that repairs can be made without re-grinding or facing off the valve seats and in this connection, to provide a faucet or cock in which the packing constituting the valve seat may be readily tightened up from time to time to take up wear and to keep the valve from leaking and further prevents any water from entering the stuffing box of the valve.

Another object is to provide a valve of this character which is so designed as to stand longer service without any necessity of making repairs and in which all parts can be removed from the discharge side of the valve and which dispenses with all springs or screws, these being a source of trouble by rusting and corroding.

Another object is to provide a valve in which there is no binding of the valve stem and in which the ball valve proper is free to move back and forth under pressure and follow up the wear of the washer or packing which constitutes the seat.

Still another object is to improve upon the construction of the means for packing the stem of the valve to prevent leakage.

My invention is illustrated in the accompanying drawings, wherein:—

Figure 1 is a vertical sectional view of a faucet having a valve constructed in accordance with my invention;

Figure 2 is a section on the line 2—2 of Figure 1;

Figure 3 is an end elevation of the valve 26 showing the stem in dotted lines; and Figure 4 is a vertical sectional view through a slightly modified form of faucet.

Referring to these drawings and particularly to Figure 1, it will be seen that I have illustrated my invention as applied to a common form of faucet and that in this figure 10 designates the body of the faucet provided with the entrance nipple 11, exteriorly screw threaded for the finishing flange or washer 12. The body 10 has an upwardly extending annular portion 13 exteriorly screw threaded to be engaged by a cap 14 which constitutes, with the packing therein, a stuffing box. The discharge end of the body 10 is formed with an annular shoulder 15 and preferably with interior screw threads 16 for the reception of an exteriorly screw threaded cap 17, which is annular in form to permit the passage of a spout or nozzle 18. This nozzle may be of any desired form but the inner end of the nozzle is formed with an outwardly projecting annular flange 19 adapted to fit within the screw threaded portion 16 and abut against the shoulder 15. Inward of this flange 19 there is formed an axially extending flange 20 which fits snugly within the opening within the body of the valve. Disposed within this flange is a washer or gasket 21, preferably of "vim" leather though this washer or packing member might be made of other materials and the the inner face of this washer is concave.

Inward of the nipple 11 the body 10 is enlarged to form an annular chamber 22 which is disposed the elongated annular packing member 23, preferably of rubber and having a concave outer end. This outer end of the packing member 23 extends beyond the adjacent portion of the valve body and projects into the space 24 of the valve body and, therefore, there is required some means for preventing this inner and relatively widened end portion from expanding under the pressure of water and leaking. I, therefore, surround this projecting portion of this washer or packing member 23 with a metallic band or ring 25, as shown in Figure 1.

Disposed in the space 24 and between the inner ends of the packing members is a globular valve 26 preferably of bronze or like material and having a central diametric passage 27 which is adapted to register with the central openings in the packing members 21 and 23. This ball valve 26 is provided upon its upper surface with two upwardly projecting lugs 28', the inner faces of which are parallel to define a transverse grooved opening at the ends of the lugs.

Resting upon a seat 28 formed in the upwardly extending neck 13 is a disk 29 forming part of the stem 30 by which the valve is manipulated. Projecting downward from this disk is a lug 31 which engages between the lugs 28'. Thus, when the stem 30 is oscillated the valve 26 will be oscillated but when the valve is closed and turned so that the passage 27 is at right angles to the longitudinal axis of the body 10, the valve is free to be shifted by the pressure of water against the seat 21 without any tendency to bind the stem 30. The cap 14 is formed with a shoulder 31' and disposed above the disk 29 is a brass washer 32 and a second washer 33, both made of fiber, rubber or any other suitable material, and within the cap 14 there is disposed a rubber packing 34. It will be obvious that as the cap 14 is screwed downward this rubber packing 34 will be compressed and forced against the stem 30 so that all leakage past the valve is prevented, the cap 14 with the packing members therein constituting a stuffing box. In order to limit the rotation of the stem 30 I cut away the disk 29 as at 35, to provide opposed shoulders disposed in quartering relation to each other and provide an inwardly projecting pin 36 disposed in the space 35 and adapted to be engaged by the shoulders as the stem is oscillated. The stem, of course, carries the usual handle 37.

It will be obvious from this construction it is only necessary to rotate the member 17 in order to force the spout 18 inward and force the packing member 21, which constitutes a seat, to any desired degree against the ball valve 26 and this pressure will force the ball valve rearward and against the washer or packing 23 so that by a minimum operation the valve may be kept at all times perfectly tight and any play taken up.

In Figure 2, I illustrate another form of valve which is the same in principle as the valve previously described. In this case I have illustrated a vertically disposed valve body designated 38 and having the integral spout 39. Directly opposite the spout the valve body is formed with an opening having internal screw threads 40 on its wall and this opening is closed by a cap 41 exteriorly screw threaded. Disposed within this cap is the annular packing member 42 having a concave seat upon its inner face. By turning up on this cap this packing member 42 may be forced inward against the globular valve. Disposed opposite the packing member 42 is the washer or packing member 43. This washer 43 is preferably of leather, as before stated, and the member 42 is preferably of rubber. The upper end of the valve body is screw threaded for engagement by the cap 44 which is practically the same as the cap 14 and, passing through this cap is the stem 45 carrying at its upper end the usual handle having a disk 46 and a downwardly projecting lug 47. The same means are used as previously described for limiting the movement of the stem to a quarter rotation and the same packing means are used within the cap 44 as previously described. Disposed within the valve body and between the seats 42 and 43 is a globular valve 48 having an angular passage way 49 through it, which in one position of the valve, communicates with the nozzle 39 and with the vertical bore 50 of the vertically extending nipple 51 of the body. In the other position of the valve the passage through the bore 50 and the nozzle 39 is cut off. When the stem 45 is shifted to close the valve the lugs 52, which project upward from the valve 48 on each side of the lug 47, permit the ball valve to shift against its seat without any tendency to bind. This is also true when the cap 41 is turned inward in order to force the packing 42 against the ball which of course, forces the ball laterally against the packing 43 and compresses this packing 43. The operation of both of these valves is perfectly obvious from the drawings and needs no further description.

It will be obvious that various minor changes might be made within the scope of the claim and that I do not wish to be limited to the exact details shown.

I claim:—

A cock or faucet of the character described comprising a body, a globular valve therein, a stem entering the body and operatively engaging the valve to turn it, a tubular packing member of elastic material disposed within the body and opposed to said valve and projecting inward beyond the inner face of the body, said inwardly projecting portion having a concave face against which the valve bears, and a metallic band surrounding said inwardly projecting portion and holding said portion from expansion under pressure.

In testimony whereof I hereunto affix my signature.

HENRY H. RIGGIN.